United States Patent [19]
Nakata et al.

[11] Patent Number: 5,585,032
[45] Date of Patent: Dec. 17, 1996

[54] FERROMAGNETIC FINE POWDER FOR MAGNETIC RECORDING

[75] Inventors: Kazuo Nakata, Moriyama; Masaharu Hirai, Shiga-ken; Nobusuke Takumi; Saburo Kato, both of Kusatsu, all of Japan

[73] Assignee: Ishihara Sangyo Kaisha, Ltd., Osaka, Japan

[21] Appl. No.: 437,544

[22] Filed: May 9, 1995

Related U.S. Application Data

[63] Continuation-in-part of Ser. No. 188,734, Jan. 31, 1994, abandoned, which is a continuation of Ser. No. 970,235, Nov. 2, 1992, abandoned, which is a continuation of Ser. No. 673,157, Mar. 19, 1991, abandoned, which is a continuation of Ser. No. 298,888, filed as PCT/JP88/00391 Apr. 21, 1988, abandoned.

[30] Foreign Application Priority Data

Apr. 21, 1987 [JP] Japan .................................. 62-98395

[51] Int. Cl.$^6$ ..................................... C04B 35/26
[52] U.S. Cl. ................. 252/62.62; 252/62.63; 252/62.59; 423/593
[58] Field of Search ............. 423/593; 252/62.62, 252/62.63, 62.59

[56] References Cited

U.S. PATENT DOCUMENTS

| | | | |
|---|---|---|---|
| 4,705,718 | 11/1987 | Kitahata | 428/323 |
| 4,778,734 | 10/1988 | Ohdan et al. | 428/694 |

FOREIGN PATENT DOCUMENTS

| | | |
|---|---|---|
| 3541857 | 8/1995 | Denmark . |
| 61-133020 | 6/1961 | Japan . |
| 56-160328 | 12/1981 | Japan . |
| 58-56302 | 4/1983 | Japan . |

*Primary Examiner*—Melissa Bonner
*Attorney, Agent, or Firm*—Cushman, Darby & Cushman IP Group of Pillsbury, Madison & Sutro LLP

[57] ABSTRACT

Ferromagnetic fine powder for magnetic recording, characterized by comprising platelet like ferrite crystal particles which have such a metallic element composition that the Ba/Fe molar ratio is 1/50 to 1/8 and that the total amount of Ni and Zn is less than 0.5 mole and not less than 0.07 mole per mole of Fe, a crystal phase of magnetoplumbite phase, spinel phase or composite phase thereof and a saturation magnetization of 60 emu/g or more; and a process for producing said ferromagnetic fine powder for magnetic record.

9 Claims, 16 Drawing Sheets

EXAMPLE 1

5,585,032

1

FERROMAGNETIC FINE POWDER FOR MAGNETIC RECORDING

This is a continuation-in-part (CIP) of application Ser. No. 08/188,734, filed on Jan. 31, 1994, now abandoned, which was a continuation of application Ser. No. 07/970,235, filed on Nov. 2, 1992, now abandoned, which was a continuation of application Ser. No. 07/673,157, filed Mar. 19, 1991 now abandoned, which was a continuation of application Ser. No. 07/298,888, filed as PCT/JP88/00391 aPR. 21, 1988, now abandoned.

TECHNICAL FIELD

This invention relates to ferromagnetic fine powder for magnetic recording comprising barium ferrite crystal particles which is useful in high-density magnetic recording medium, for example, in various information processings and recordings by means of audio tape, video tape, magnetic cards, magnetic disks, computer tapes and the like, especially perpendicular recording utilizing residual magnetization perpendicular to the recording medium plane.

BACKGROUND ART

As ferromagnetic fine powder for magnetic recording medium, there are most generally used magnetic powders of needle crystals of $\gamma$-$Fe_2O_3$, cobalt coated $\gamma$-$Fe_2O_3$, iron-type metals, $Cr_2O_3$ and the like. These magnetic powders have a needle-like particle shape and hence are not sufficient in packing density. Cobalt coated $\gamma$-$Fe_2O_3$ permits enhancement of coercive force but is not satisfactory in the thermal stability of coercive force, etc. Further in the case of the iron-type metals, a high saturation magnetization can be attained, but a problem of so-called low corrosion resistance is unavoidable and there are not a few problems, for example, easy deterioration of the stability with the lapse of time of magnetic characteristics. In addition, in the case of the above-mentioned needle crystals magnetic powders, magnetic recording and processing is conducted by a so-called longitudinal recording method which comprises coating on a base film a coating liquid prepared by dispersing the magnetic powder in a binder resin, thereby forming a magnetic recording medium, orienting the needle crystals in the direction of inside the surface of the medium, and utilizing the residual magnetization in said direction. It is well known that in such a recording method, enhancement of the recording density by use of the aforesaid needle crystal magnetic powder is very difficult because an attempt to increase the density of magnetic recording results in an increase of the demagnetizing field in the medium and tends to deteriorate the playback characteristics particularly in the short wavelength region.

On the other hand, in consideration of the above problems in the case where the aforesaid needle crystals magnetic powders are used, attempts have been made in recent years to enhance the recording density by applying a perpendicular magnetic recording method which comprises forming a coated-form magnetic recording medium by use of powder consisting of platelet like hexagonal ferrite crystal particles, e.g., barium ferrite crystal particles, and magnetizing the recording medium in a direction perpendicular to the surface of the recording medium. Various barium ferrite magnetic powders used in the above recording method have been proposed. Many of them consist of magnetoplumbite type barium ferrite crystal particles composed of $BaO \cdot nFe_2O_3$ (n=5 or 6) in which a portion of the Fe atoms have been usually replaced by a very small amount of various foreign metallic elements such as Co and Ti for controlling the coercive force. Such barium ferrite magnetic powders consist of platelet like particles and hence are excellent in surface smoothness and packing density in magnetic recording medium. However, only those having a saturation magnetization of at most about 60 emu/g have been obtained, and improvement of the saturation magnetization is eagerly desired for increasing the output of magnetic recording medium.

It is known with respect to the saturation magnetization of barium ferrite crystals, that crystals of W-type crystal phase ($Ba \cdot Me^{2+}Fe_{16}O_{27}$) have a higher saturation magnetization than do crystals of the above-mentioned magnetoplumbite type crystal phase. It has been also proposed to utilize the crystals of W-type crystal phase as a high-saturation-magnetization ferrite-based magnetic recording material. The W-type barium ferrite magnetic powders according to this proposal are obtained usually by preparing a blend of metallic elements having a predetermined composition, and calcining the blend at a high temperature of about 1100°–1350° C. The barium ferrite magnetic powders thus obtained have a high saturation magnetization, but they tend to undergo interparticle sintering or particle coarsening, so that deterioration of their dispersibility and orientation is unavoidable. Thus, they are not satisfactory as high-packing-density magnetic recording materials and involve not a few problems which should be improved. However with the tendency toward enhancement of the recording density, S/N ratio and output of magnetic recording medium, there has recently been more and more desired ferrite-based ferromagnetic powder which has a still finer particle size of 0.3 µm or less, preferably 0.2 µm or less and a high saturation magnetization.

SUMMARY OF THE INVENTION

This invention is intended to provide platelet like ferrite magnetic powder having a very fine particle size and a high saturation magnetization which is particularly suitable as a magnetic material for high-density magnetic recording in the case of not only perpendicular magnetic recording out also longitudinal magnetic recording.

The present inventors have conducted various researches on atomization of coercive force-controlled element-substituted magnetoplumbite type barium ferrite which is suitable for enhancing the recording density of magnetic recording medium. The present inventors have noted the importance of development of platelet like ferrite magnetic powder having high saturation magnetization characteristics as described above, and have conducted further research. Consequently, the present inventors have found that ferrite magnetic powder consisting of platelet like ferrite crystal particles in which Fe atoms constituting the particles have been replaced by a combination of two specific foreign metallic elements in a definite or larger amount in a certain range, and having a specific crystal phase different from W-type, can satisfy both requirements, i.e., high saturation magnetization characteristics and platelet like and very fine particles, whereby this invention has been accomplished.

That is to say, this invention relates to ferromagnetic fine powder for magnetic recording characterized by comprising platelet like ferrite crystal particles having such a metallic element composition that the Ba/Fe molar ratio is 1/50 to 1/8 and that the total amount of Ni and Zn is less than 0.5 mole and not less than 0.07 mole per mole of Fe, a crystal phase of magnetoplumbite phase, spinel phase, or composite phase thereof, and a saturation magnetization of 60 emu/g or more; and a process for producing said fine powder.

BRIEF DESCRIPTION OF THE DRAWINGS

Further objects and advantages of the present invention will be better understood by carefully reading the following detailed description of the present invention in conjunction with accompanying drawings, of which.

DETAILED DESCRIPTION OF THE INVENTION

Figure 1:
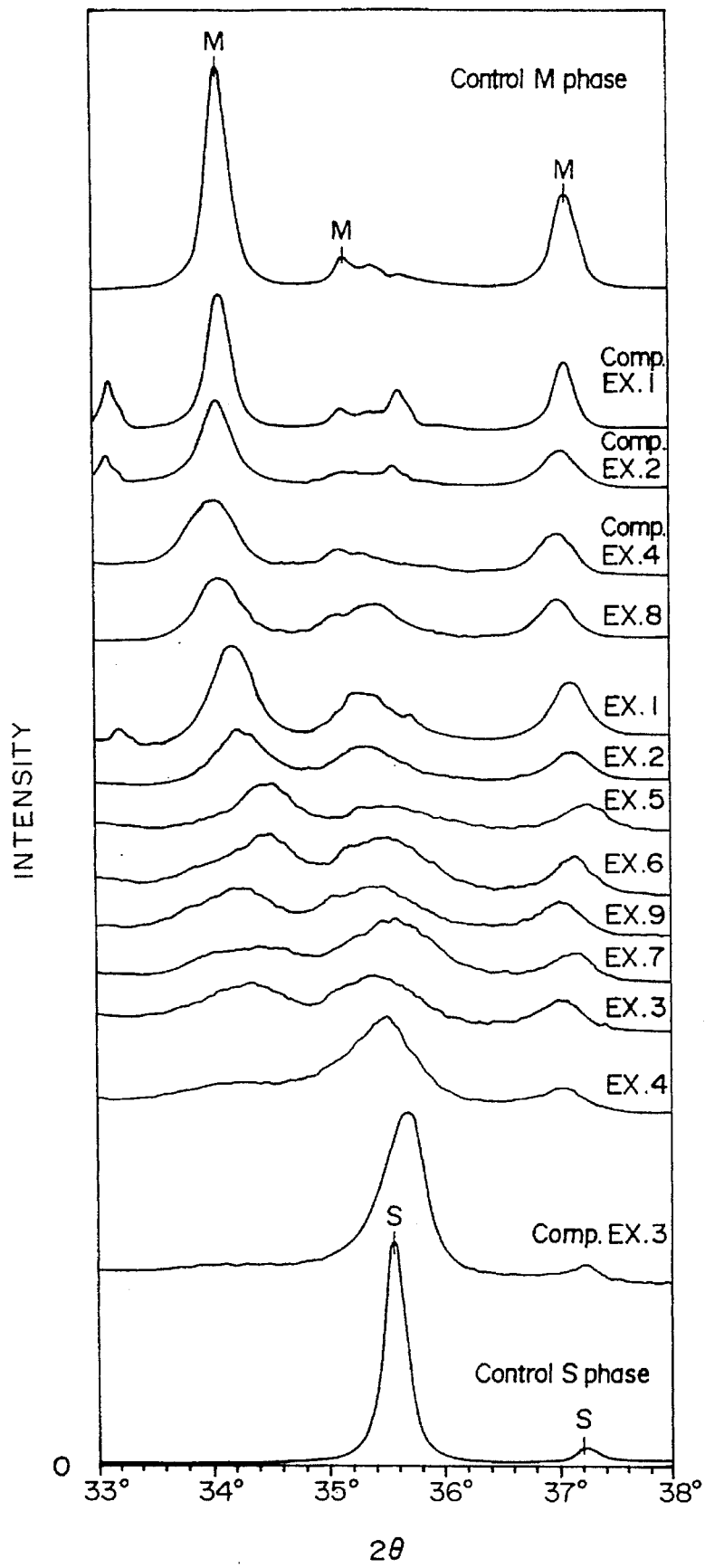
FIG. 1 shows the X-ray diffraction patterns of Examples 1–9, comparative Examples 1–4 and Control M and S phases.

The ferromagnetic fine powder for magnetic recording of this invention contains Ba, Fe, Ni and Zn as constituents. It is sufficient that the quantitative relationship between these metals satisfy the requirements described below, and the amounts of the constituents can be optionally selected in the ranges corresponding to the requirements.

As to the metallic elements, the Ba/Fe molar ratio is 1/50 to 1/8, preferably 1/45 to 1/10, and more preferably 1/44 to 1/12. The total amount of Ni and Zn (Ni+Zn) is 0.07 mole to 0.5 mole where a Zn/Fe molar ratio is 0.063 or more and a Ni/Fe molar ratio is 0.062 or more, preferably 0.125 to 0.380 mole and more preferably 0.14 to 0.4 mole per mole of Fe. For attaining a sufficiently high saturation magnetization, it is preferable to adjust the amount of Zn to 0.03 mole or more, and preferably 0.063 to 0.19 per mole of Fe. The Ni/Fe molar ratio is 0.62 or more and preferably 0.062 to 0.19.

When the Ba/Fe molar ratio is beyond the above range, the exhibition of saturation magnetization is insufficient. On the other hand, when the Ba/Fe molar ratio is below the above range, the particle size of the ferromagnetic fine powder becomes too large. Therefore, it is not desirable. When the total amount of Ni and Zn (Ni+Zn) and the amount of Zn are below the above respective ranges, the saturation magnetization cannot be sufficiently enhanced to the desired range. As described above, including Ni and Zn in the ferromagnetic fine powder makes/it easy to make the particle size fine, and therefore co-use of a combination of Ni and Zn is important in this invention and their synergistic effect remarkably enhances the saturation magnetization. The platelet like ferrite crystal particle powder obtained according to this invention has a saturation magnetization of 60 emu/g or more and a particle size of 0.15 µm or less, and hence is very suitable as ferromagnetic fine powder for high magnetic recording.

In this invention, it is also possible to adjust the coercive force to a value in a desired range by replacing a portion of the Fe atoms by a small amount of various foreign metallic elements such as Co, Ti, etc. which are included in the ferromagnetic fine powder by a conventional method, for example, for controlling the coercive force.

The ferromagnetic fine powder comprising platelet like ferrite crystal particles of this invention may be any one so long as it substantially shows a X-ray diffraction pattern of magnetoplumbite phase, spinel phase, or composite phase thereof, though its crystal phase is particularly preferably a composite phase of magnetoplumbite phase and spinel phase.

The ferromagnetic fine powder according to the above-mentioned constitution of this invention can be produced, for example, in the following manner. First, there is prepared an aqueous solution of metal compounds which contains a barium compound, an iron compound and a compound of nickel and zinc in their respective predetermined amounts.

As these metal compounds, any compounds of the metals may be used so long as they are soluble in water, and there are exemplified inorganic acid salts such as sulfates, halides, nitrates and the like, and organic acid salts such as acetates and the like. In particular, chlorides and nitrates are suitably used.

Next, an alkaline suspension having a pH of 11 or higher is prepared by contacting and mixing the above-mentioned aqueous solution of metal compounds with an aqueous solution of an alkali such as NaOH, KOH, NH$_4$OH or the like. The contacting and mixing may be conducted by any of addition of the aqueous solution of metal compounds to the aqueous alkali solution, addition of the aqueous alkali solution to the aqueous solution of metal compounds, and simultaneous addition of the two solutions. In this case, for producing still finer particles and improving their dispersibility, it is more preferable that the alkali concentration of the aforesaid suspension is 1.5 moles/liter or more, more preferably 2 moles/liter or more on a free OH basis.

In preparing the alkaline suspension, metal compounds may be further added so that the suspension contains predetermined amounts of the metallic elements.

The alkaline suspension thus obtained is subjected to heat reaction treatment at 30° to 250° C., preferably 60° to 200° C. in a reactor equipped with a heater or in a pressure vessel such as an autoclave to form a precursor of ferrite as to the above heat treatment. The treatment temperature is below the above range, the progress of reaction is too slow, while when it is beyond the above range, there are disadvantages, for example, a high apparatus cost.

The ferrite precursor thus obtained is filtered, washed with water, dried, and subjected to calcining treatment. In order to make the precursor into platelet ferrite particles by calcining treatment, the precursor is calcined at 600° to 1,000° C., preferably 700° to 900° C. When the calcining temperature is below the above range, crystallization into ferrite particle does not proceed sufficiently and the saturation magnetization is low. When the calcining temperature is beyond the above range, ferrite particles are sticked to one another or sintered, resulting in formation of an aggregate, so that the dispersibility in formation into a coating material tends to be greatly deteriorated. The calcining can be conducted usually for about 0.5– 5 hours by means of any of various types of apparatuses such as rotary furnace, fluidized-bed furnace, and the like. For prevention of sintering of the particles, control of their shape, improvement of their magnetic characteristics, etc., the following treatment may be carried out before the above-mentioned calcining treatment. A silicon compound or a phosphorus compound is attached to the aforesaid precursor, or a halide or sulfate of alkali metal or alkaline earth metal is mixed with the precursor, and then calcining is conducted.

As another method for including the aforesaid metallic elements, Ni and Zn in the ferromagnetic fine powder, there can be employed a method which comprises treating the ferrite precursor obtained, as described above, by heating at 60° to 250° C. with a portion or the whole of predetermined amounts of Ni and Zn to be included. As a method for the treatment in this case, there is exemplified, for example, a method which comprises adding an aqueous solution of salt compounds of said metals to an aqueous suspension of the ferrite precursor, evaporating the resulting mixture to dryness or neutralizing the mixture with an alkali, and thereby applying a precipitate of said metals to particles of the precursor.

This invention is further illustrated below with reference to Examples and Comparative Examples.

EXAMPLES OF THE INVENTION

Example 1

83.3 Milliliters of an aqueous $BaCl_2$ solution having a concentration of 1 mole/liter, 1,000 ml of an aqueous $FeCl_3$ solution having a concentration of 1 mole/liter, 83.3 ml of an aqueous $NiCl_2$ solution having a concentration of 1 mole/liter and 83.3 ml of an aqueous $ZnCl_2$ solution having a concentration of 1 mole/liter were mixed [Ba/Fe (Molar ratio)=$1/12$, (Ni+Zn)/Fe (molar ratio)=0.17], and the mixture was added to 1,950 ml of an aqueous NaOH solution having a concentration of 10 moles/liter to prepare an alkaline suspension (free OH concentration: 5 moles/liter) containing a brown precipitate. Subsequently, said suspension was heated in an autoclave at 150° C. for 1 hour to form a ferrite precursor.

The ferrite precursor obtained was filtered, washed with water, dried, and then calcined at 800° C. for 1 hour to obtain powder consisting of platelet ferrite crystal particles. Then, the powder obtained was immersed in an aqueous acetic acid solution, thereafter filtered, washed with water, and dried to obtain ferromagnetic fine powder of this invention. This sample is named (A).

EXAMPLE 2

Ferromagnetic fine powder of this invention was obtained by carrying out treatment by the same method as in Example 1, except that 55.6 ml of an aqueous $BaCl_2$ solution having a concentration of 1 mole/liter, 1,000 ml of an aqueous $FeCl_3$ solution having a concentration of 1 mole/liter, 83.3 ml of an aqueous $NiCl_2$ solution, and 83.3 ml of an aqueous $ZnCl_2$ solution having a concentration of 1 mole/liter were mixed [Ba/Fe (molar ratio)=$1/12$, (Ni+Zn)/Fe (molar ratio)= 0.17] and that the mixture was added to 1,911 ml of an aqueous NaOH solution having a concentration of 10 moles/liter to prepare an alkaline suspension (free OH concentration: 5 moles/liter) containing a brown precipitate. This sample is named (B).

EXAMPLE 3

Ferromagnetic fine powder of this invention was obtained by carrying out treatment by the same method as in Example 1, except that 41.7 ml of an aqueous $BaCl_2$ solution having a concentration of 1 mole/liter, 1,000 ml of an aqueous $FeCl_3$ solution having a concentration of 1 mole/liter, 125 ml of an aqueous $NiCl_2$ solution having a concentration of 1 mole/liter and 125 ml of an aqueous $ZnCl_2$ solution having a concentration of 1 mole/liter were mixed [Ba/Fe (molar ratio)=$1/24$, (Ni+Zn)/Fe (molar ratio)=0.25] and that the mixture was added to 2,008 ml of an aqueous NaOH solution having a concentration of 10 moles/liter to prepare an alkaline suspension (free OH concentration: 5 moles/liter) containing a brown precipitate. This sample is named (C).

EXAMPLE 4

Ferromagnetic fine powder of this invention was obtained by carrying out treatment by the same method as in Example 1, except that 22.7 ml of an aqueous $BaCl_2$ solution having a concentration of 1 mole/liter, 1,000 ml of an aqueous $FeCl_3$ solution having a concentration of 1 mole/liter, 182 ml of an aqueous $NiCl_2$ solution having a concentration of 1 mole/liter and 182 ml of an aqueous $ZnCl_2$ solution having a concentration of 1 mole/liter were mixed [Ba/Fe (molar ratio)=$1/44$, (Ni+Zn)/Fe (molar ratio)=0.36] and that the mixture was added to 2,141 ml of an aqueous NaOH solution having a concentration of 10 moles/liter to prepare an alkaline suspension (free OH concentration: 5 moles/liter) containing a brown precipitate. This sample is named (D).

EXAMPLE 5

Ferromagnetic fine powder of this invention was obtained by carrying out treatment by the same method as in Example 1, except that 62.5 ml of an aqueous $BaCl_2$ solution having a concentration of 1 mole/liter, 1,000 ml of an aqueous $FeCl_3$ solution having a concentration of 1 mole/liter, 62.5 ml of an aqueous $NiCl_2$ solution having a concentration of 1 mole/liter and 62.5 ml of an aqueous $ZnCl_2$ solution having a concentration of 1 mole/liter were mixed [Ba/Fe (molar ratio)=$1/16$, (Ni+Zn)/Fe (molar ratio)=0.125] and that the mixture was added to 1,863 ml of an aqueous NaOH solution having a concentration of 10 moles/liter to prepare an alkaline suspension (free OH concentration: 5 moles/liter) containing a brown precipitate. This sample is named (E).

A Ni/Fe molar ratio of 0.062 or more is supported by the data of Example 5. The molar ratio of (Ni+Zn)/Fe is 0.125. Recited in Table 1 for Example 5 is the ratio of Zn/Fe being 0.063. Thus the following calculation is made for Ni/Fe:

(Ni+Zn)/Fe=Ni/Fe+Zn/Fe=Ni/Fe+0.063=0.125 and thus:

$$Ni/Fe=0.125-0.063=0.062.$$

The support for "or more" comes from the fact that the value listed for Example 5 of Ze/Fe is the smallest value in Table 1 for the discussed examples. All other examples have a higher Zn/Fe ratio. Thus, when the value of Ni/Fe is calculated in any other example, the value is larger than that in Example 5.

EXAMPLE 6

Ferromagnetic fine powder of this invention was obtained by carrying out treatment by the same method as in Example 1, except that 62.5 ml of an aqueous $BaCl_2$ solution having a concentration of 1 mole/liter, 1,000 ml of an aqueous $FeCl_3$ solution having a concentration of 1 mole/liter, 125 ml of an aqueous $NiCl_2$ solution having a concentration of 1 mole/liter and 125 ml of an aqueous $ZnCl_2$ solution having a concentration of 1 mole/liter were mixed [Ba/Fe (molar ratio)=1/16, (Ni+Zn)/Fe (molar ratio)=0.25] and that the mixture was added to 2,038 ml of an aqueous NaOH solution having a concentration of 10 moles/liter to prepare an alkaline suspension (free OH concentration: 5 moles/liter) containing a brown precipitate. This sample is named (F).

EXAMPLE 7

Ferromagnetic fine powder of this invention was obtained by carrying out treatment by the same method as in Example 1, except that 62.5 ml of an aqueous $BaCl_2$ solution having a concentration of 1 mole/liter, 1,000 ml of an aqueous $FeCl_3$ solution having a concentration of 1 mole/liter, 188 ml of an aqueous $NiCl_2$ solution having a concentration of 1 mole/liter and 188 ml of an aqueous $ZnCl_2$ solution having a concentration of 1 mole/liter were mixed [Ba/Fe (molar ratio)=1/16, (Ni+Zn)/Fe (molar ratio)=0.38] and that the mixture was added to 2,213 ml of an aqueous NaOH solution having a concentration of 10 moles/liter to prepare an alkaline suspension (free OH concentration: 5 moles/liter) containing a brown precipitate. This sample is named (G).

EXAMPLE 8

Ferromagnetic fine powder of this invention was obtained by carrying out treatment by the same method as in Example 1, except that 62.5 ml of an aqueous $BaCl_2$ solution having a concentration of 1 mole/liter, 1,000 ml of an aqueous $FeCl_3$ solution having a concentration of 1 mole/liter, 93.8 ml of an aqueous $NiCl_2$ solution having a concentration of 1 mole/liter, 93.8 ml of an aqueous $ZnCl_2$ solution having a concentration of 1 mole/liter, 50 ml of an aqueous $CoCl_2$ solution having a concentration of 1 mole/liter and 50 ml of an aqueous $TiCl_4$ solution having a concentration of 1 mole/liter were mixed [Ba/Fe (molar ratio)=1/16, (Ni+Zn)/Fe (molar ratio)=0.19] and that the mixture was added to 2,110 ml of an aqueous NaOH solution having a concentration of 10 moles/liter to prepare an alkaline suspension (free OH concentration: 5 moles/liter) containing a brown precipitate. This sample is named (H).

EXAMPLE 9

Ferromagnetic powder of this invention was obtained by carrying out treatment in the same manner as in Example 6, except that the temperature at heating of the alkaline suspension was changed to 90° C. This sample is named (J).

Comparative Example 1

Ferromagnetic fine powder for comparison was obtained by carrying out treatment by the same method is in Example 1, except that 62.5 ml of an aqueous $BaCl_2$ solution having a concentration of 1 mole/liter and 1,000 ml of an aqueous $FeCl_3$ solution having a concentration of 1 mole/liter were mixed [Ba/Fe (molar ratio)=1/16] and that the mixture was added to 1,688 ml of an aqueous NaOH solution having a concentration of 10 moles/liter to prepare an alkaline suspension (free OH concentration: 5 moles/liter) containing a brown precipitate. This sample is named (K).

Comparative Example 2

Ferromagnetic powder for comparison was obtained by carrying out treatment by the same method as in Example 1, except that 62.5 ml of an aqueous $BaCl_2$ solution having a concentration of 1 mole/liter, 1,000 ml of an aqueous $FeCl_3$ solution having a concentration of 1 mole/liter, 31.3 ml of an aqueous $NiCl_2$ solution having a concentration of 1 mole/liter and 31.3 ml of an aqueous $ZnCl_2$ solution having a concentration of 1 mole/liter were mixed [Ba/Fe (molar ratio)=1/16, (Ni+Zn)/Fe (molar ratio)=0.063] and that the mixture was added to 1,775 ml of an aqueous NaOH solution having a concentration of 10 moles/liter to prepare an alkaline suspension (free OH concentration: 5 moles/liter) containing a brown precipitate. This sample was named (L).

Comparative Example 3

Ferromagnetic powder for comparison was obtained by carrying out treatment by the same method as in Example 1, except that 62.5 ml of an aqueous $BaCl_2$ solution having a concentration of 1 mole/liter, 1,000 ml of an aqueous $FeCl_3$ solution having a concentration of 1 mole/liter and 313 ml of an aqueous $NiCl_2$ solution having a concentration of 1 mole/liter were mixed [Ba/Fe (molar ratio)=1/16, (Ni+Zn)/Fe (molar ratio)=0.31] and that the mixture was added to 2,125 ml of an aqueous NaOH solution having a concentration of 10 moles/liter to prepare an alkaline suspension (free OH concentration: 5 moles/liter) containing a brown precipitate. This sample is named (M).

Comparative Example 4

Ferromagnetic powder for comparison was obtained by carrying out treatment by the same method as in Example 1, except that 146 ml of an aqueous $BaCl_2$ solution having a concentration of 1 mole/liter, 1,000 ml of an aqueous $FeCl_3$ solution having a concentration of 1 mole/liter, 82.5 ml of an aqueous $CoCl_2$ solution having a concentration of 1 mole/liter and 82.5 ml of an aqueous $TiCl4$ solution were mixed [Ba/Fe (molar ratio)=1/10.3, (Ni+Zn)/Fe (molar ratio)=0] and that the mixture was added to 2,068 ml of an aqueous NaOH solution having a concentration of 10 moles/liter to prepare an alkaline suspension (free OH concentration: 5 moles/liter) containing a brown precipitate. This sample is named (N).

For the above-mentioned samples (A) to (H) and (J) to (N), there were measured average particles size (Dp: electron microscopic method), coercive force (Hc) and saturation magnetization ($\sigma$s) at a measuring magnetic field of 10 KOe by means of a sample-vibrating magnetometer Model VSM-3 mfd. by Toei Industry Co. and X-ray diffraction pattern. The results of the measurements are shown in Table 1.

TABLE 1

| | | Composition of alkaline suspension (molar ratio) | | | | | Physical properties of ferrite crystal particles | | | | |
|---|---|---|---|---|---|---|---|---|---|---|---|
| | | | | | | | Hc | $\sigma_s$ | | Particle | X-ray diffraction pattern |
| Sample No. | | Ba/Fe | (Ni + Zn)/Fe | Zn/Fe | Co/Fe | Ti/Fe | (Oe) | (emu/g) | shape | size (μ) | (see Note) |
| 1 | A | 1/12 | 0.17 | 0.083 | — | — | 2120 | 60.0 | " | 0.07 | Substantially M |
| 2 | B | 1/18 | 0.17 | 0.083 | — | — | 1450 | 62.0 | " | 0.08 | M >> S |
| 3 | C | 1/24 | 0.25 | 0.13 | — | — | 921 | 65.2 | " | 0.065 | M + S |
| 4 | D | 1/44 | 0.36 | 0.18 | — | — | 263 | 70.1 | " | 0.075 | Substantially S |
| 5 | E | 1/16 | 0.125 | 0.063 | — | — | 2290 | 60.6 | " | 0.085 | Substantially M |
| 6 | F | 1/16 | 0.25 | 0.13 | — | — | 1141 | 64.6 | " | 0.065 | M >> S |
| 7 | G | 1/16 | 0.38 | 0.19 | — | — | 286 | 66.9 | " | 0.055 | M < S |
| 8 | H | 1/16 | 0.19 | 0.094 | 0.05 | 0.05 | 689 | 61.3 | " | 0.075 | M >> S |
| 9 | J | 1/16 | 0.25 | 0.13 | — | — | 1005 | 64.0 | " | 0.06 | M >> S |
| 1 | K | 1/16 | — | — | — | — | 3530 | 49.2 | " | 0.13 | M >> H |
| 2 | L | 1/16 | 0.063 | 0.031 | — | — | 2580 | 52.1 | " | 0.085 | Substantially M |
| 3 | M | 1/16 | 0.31 | — | — | — | 409 | 50.8 | " | 0.08 | M < S |
| 4 | N | 1/10.3 | — | — | 0.083 | 0.083 | 1050 | 50.5 | " | 0.08 | M |

As is clear from the results shown in Table 1, the ferromagnetic fine powders comprising ferrite crystal particles of this invention have a crystal phase of substantially M phase, S phase or composite phase thereof, are very fine, have a high saturation magnetization of 60 emu/g or more, and have a suitable coercive force for magnetic recording.

The temperature characteristic of coercive force (the change of coercive force with temperature) of the ferromagnetic fine powder comprising ferrite crystal particles of this invention was measured to show satisfactory values. Furthermore, when said ferromagnetic fine powder was dispersed in a binder resin and a magnetic recording medium was produced by a conventional method, the powder was excellent in orientation and surface smoothness.

Figure 2:
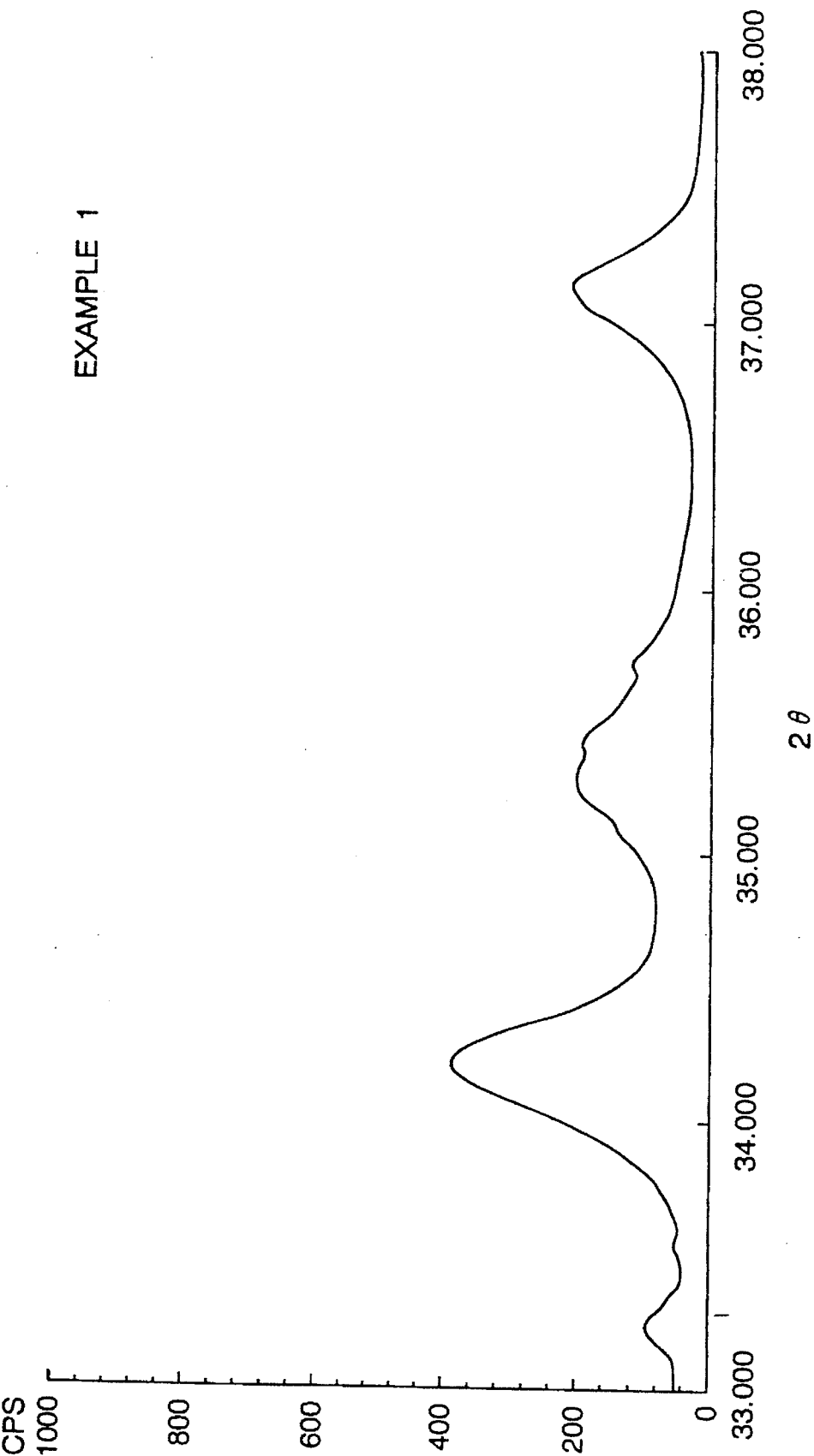
FIG. 2 shows the X-ray diffraction pattern of Example 1.

X-ray analysis was performed of Examples 1–9, Comparative Examples 1–4 and as controls, Magnetoplumbite (M) phase and Spinel (S) phase. To facilitate comparison of the X-ray diffraction patterns, all of the X-ray diffraction patterns of Examples 1–9, Comparative Examples 1–4 and Controls M and S phases are collectively shown on FIG. 1. The specific results of the X-ray diffraction patterns are explained below:

1) FIG. 2, for Example 1, shows that the X-ray (Cu-Kα) diffraction peak of the plane (107) of diffraction of M phase appeared at 2θ=34.07, whereas the peak of the same plane of the powder of Example 1 appeared at 2θ=34.20. Thus, there is a difference in the value of 2θ at which the peak appeared, between the M phase and Example 1. Furthermore, a new weak peak appeared at the lower value of 2θ. This means that the crystal form of the powder of Example 1 was completely different from that of the M phase.

Figure 3:
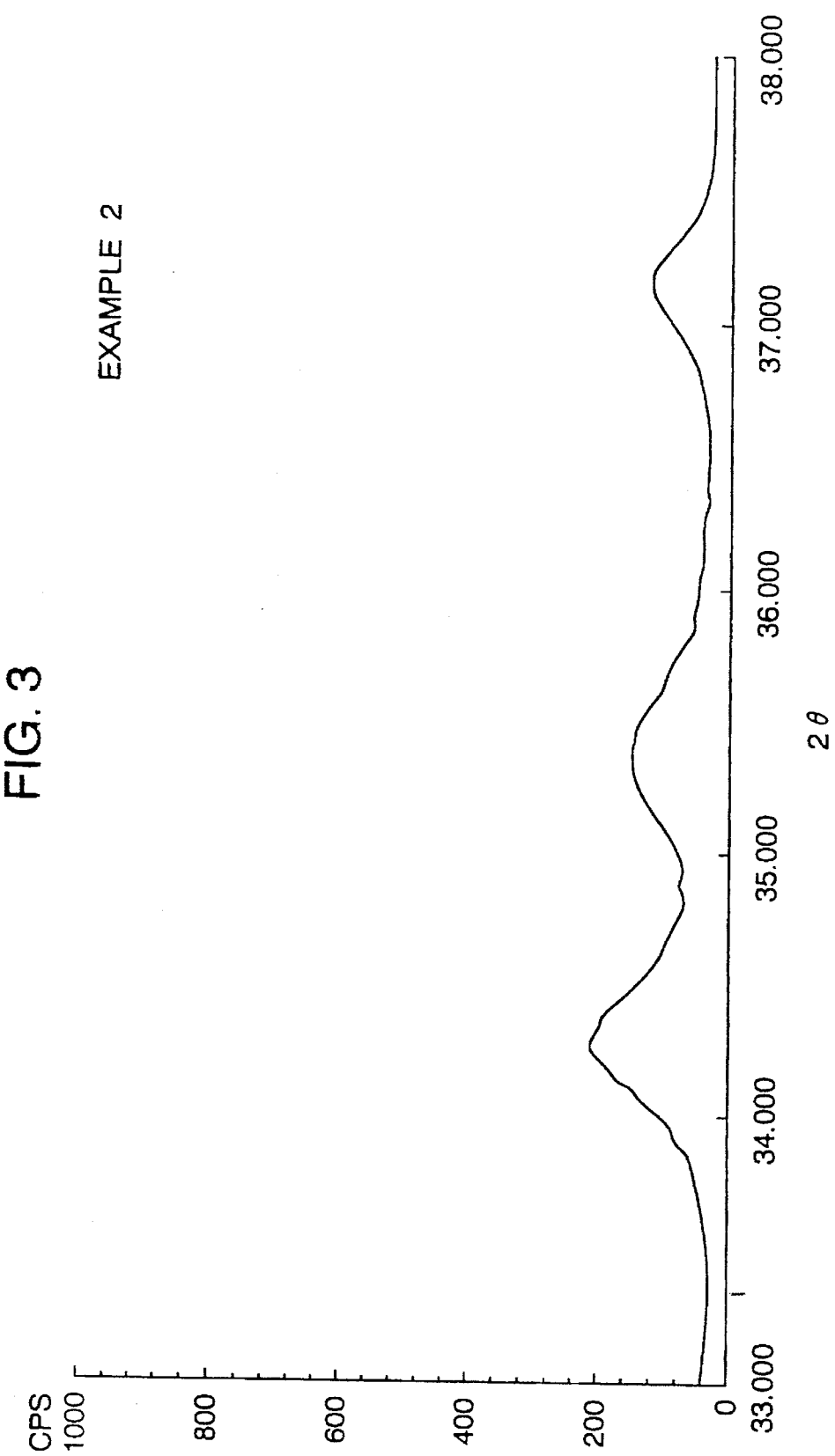
FIG. 3 shows the X-ray diffraction pattern for Example 2.

2) FIG. 3, for Example 2, shows that the X-ray diffraction peak of the plane (107) of diffraction of the powder of Example 2 appeared at 2θ=34.25. Furthermore, there was a larger difference in the pattern shape. Therefore, the powder of Example 2 is completely different in the crystal form from the M phase.

Figure 4:
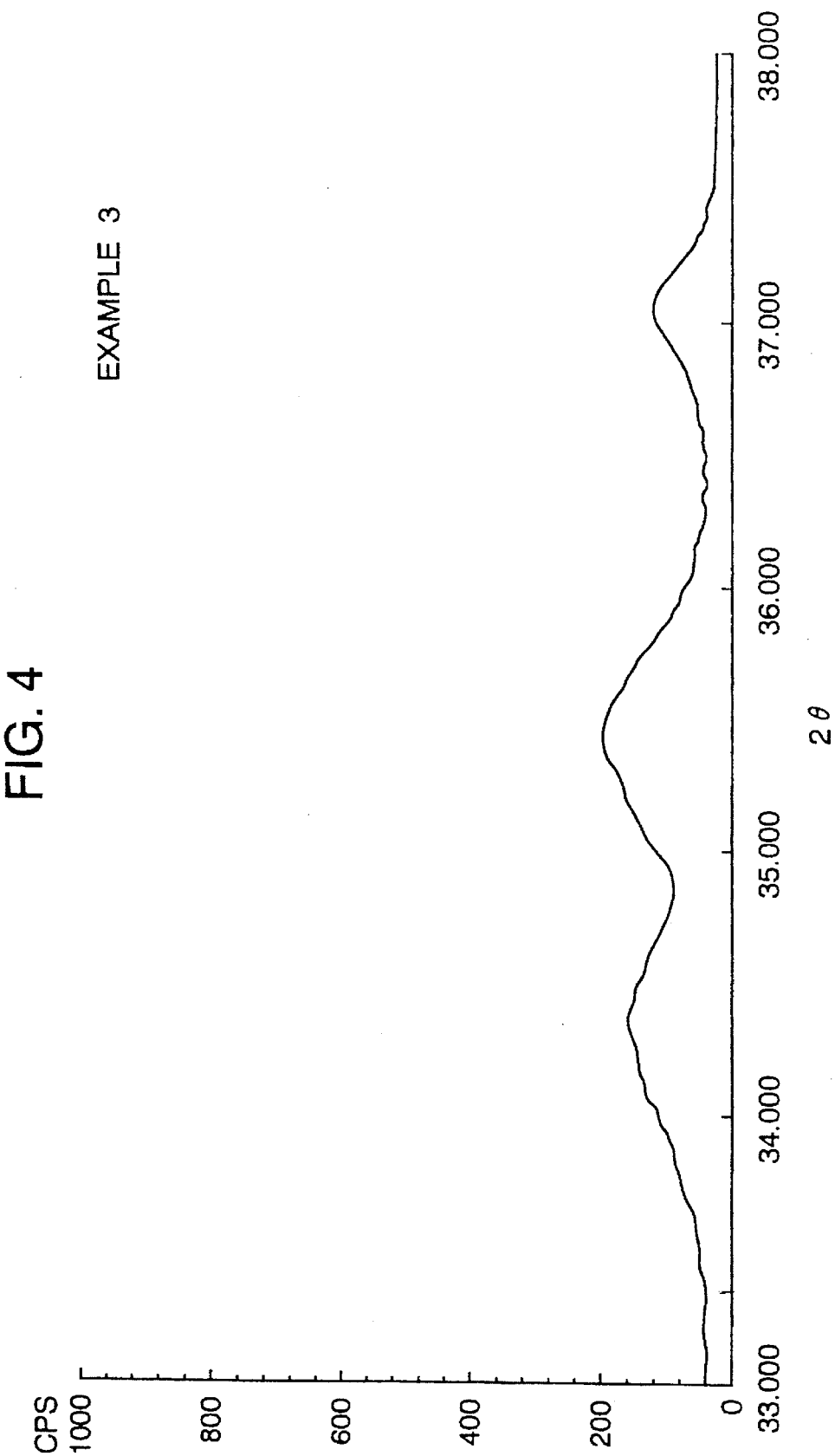
FIG. 4 shows the X-ray diffraction pattern for Example 3.

3) FIG. 4, for Example 3, shows that the X-ray diffraction peak of the plane (107) of diffraction of the powder of Example 3 appeared at 2θ=34.33. Furthermore, the X-ray diffraction peak of the plane (311) of the S phase appeared at 2θ=35.56, whereas the peak of the same plane of the powder of Example 3 appeared at 2θ=35.41. Thus, there is a difference in the value of 2θ at which the peak appeared, between the S phase and Example 3. This means that the crystal form of the powder of Example 3 was completely different from that of each of the M phase and S phase.

Figure 5:
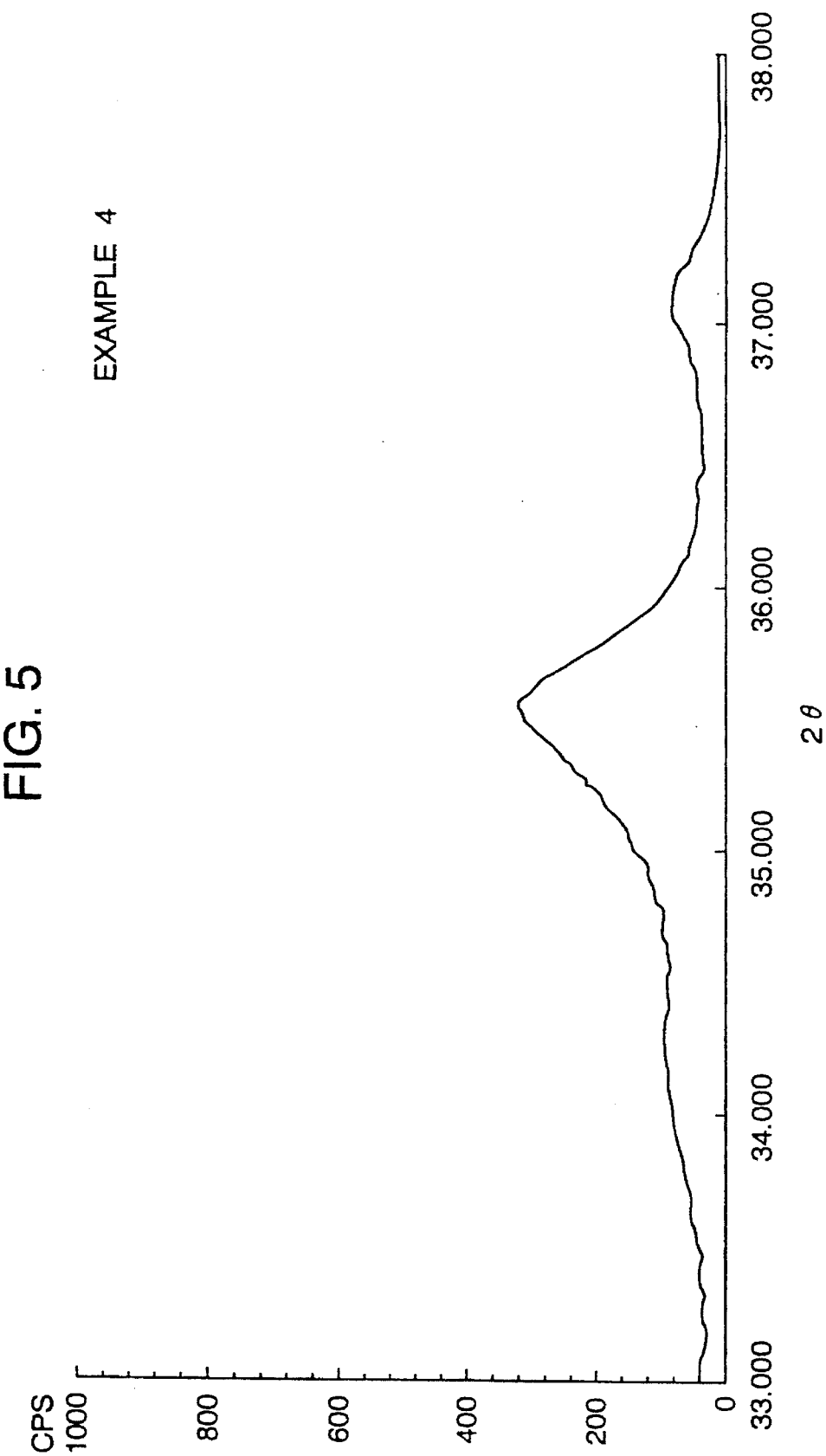
FIG. 5 shows the X-ray diffraction pattern for Example 4.

4) FIG. 5, for Example 4, shows that the X-ray diffraction peak of the plane (107) of diffraction of the powder of Example 4 appeared at 2θ=34.30. Furthermore, the X-ray diffraction peak of the plane (311) of the S phase appeared at 2θ=35.56, whereas the peak of the same plane of the powder of Example 4 appeared at 2θ=35.49. Thus, there is a difference in the value of 2θ at which the peak appeared, between the S phase and Example 4. This means that the crystal form of the powder of Example 4 was completely different from that of each of the M phase and S phase.

Figure 6:
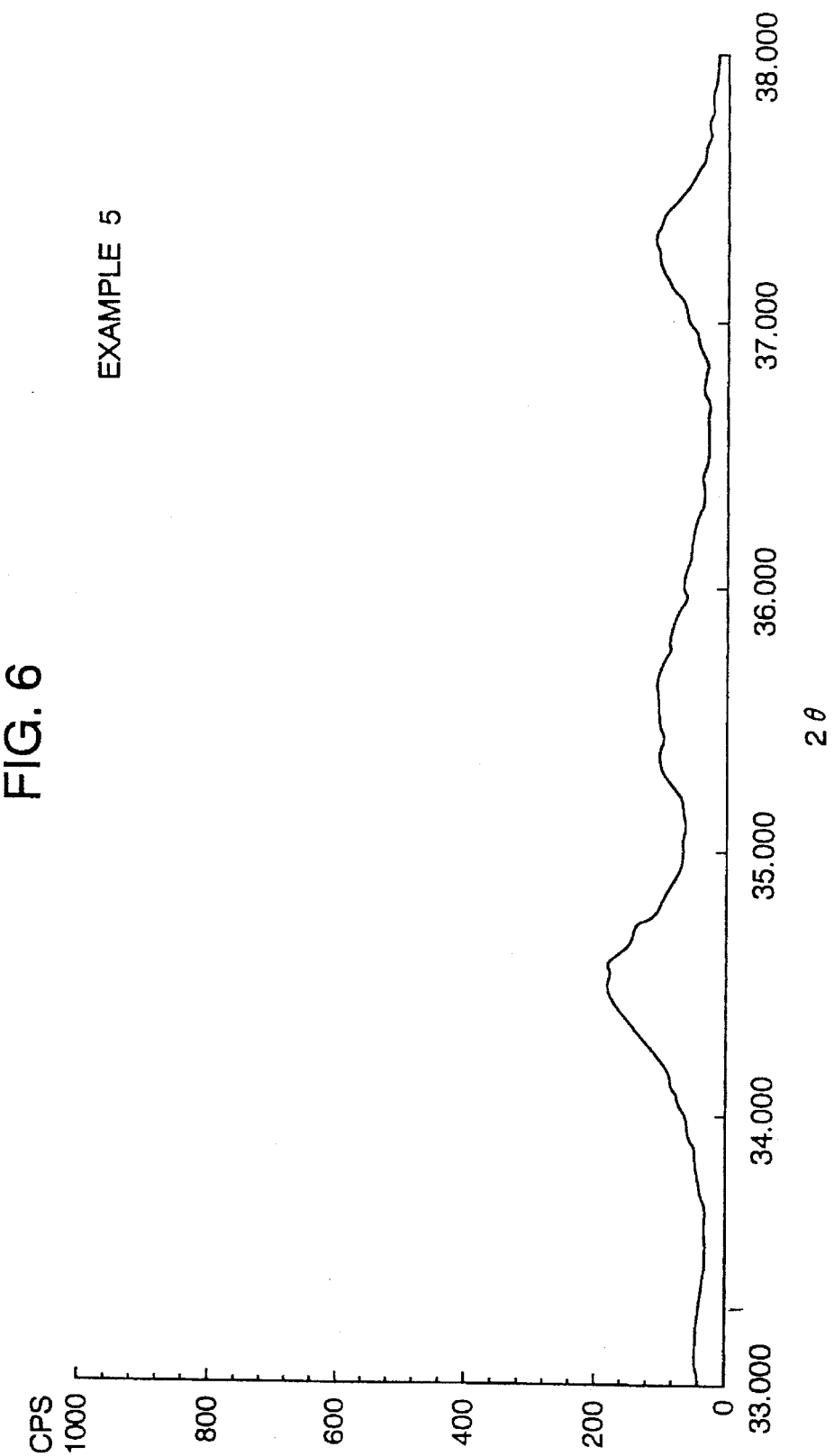
FIG. 6 shows the X-ray diffraction pattern for Example 5.

5) FIG. 6, for Example 5, shows that the X-ray diffraction peak of the plane (107) of diffraction of the powder of Example 5 appeared at 2θ=34.43. Furthermore, there was a larger difference in the pattern shape. Therefore, the powder of Example 5 is completely different in the crystal form from the S phase as well as the M phase.

Figure 7:
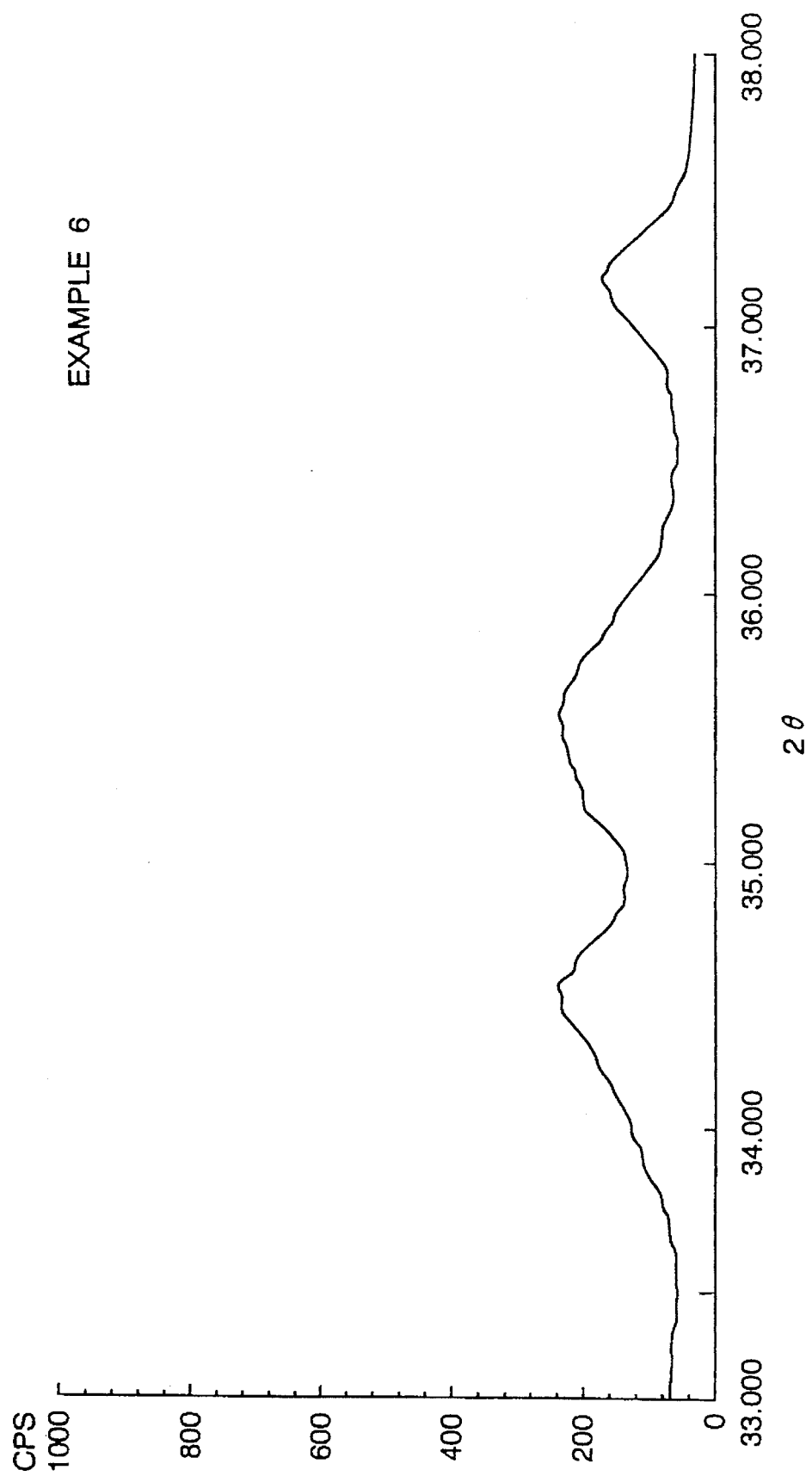
FIG. 7 shows the X-ray diffraction pattern for Example 6.

6) FIG. 7, for Example 6, shows that the X-ray diffraction peak of the plane (107) of diffraction of the powder of Example 6 appeared at 2θ=34.42. Furthermore, there was a larger difference in the pattern shape. Therefore, the powder of Example 6 is completely different in the crystal form from the S phase as well as the M phase.

Figure 8:
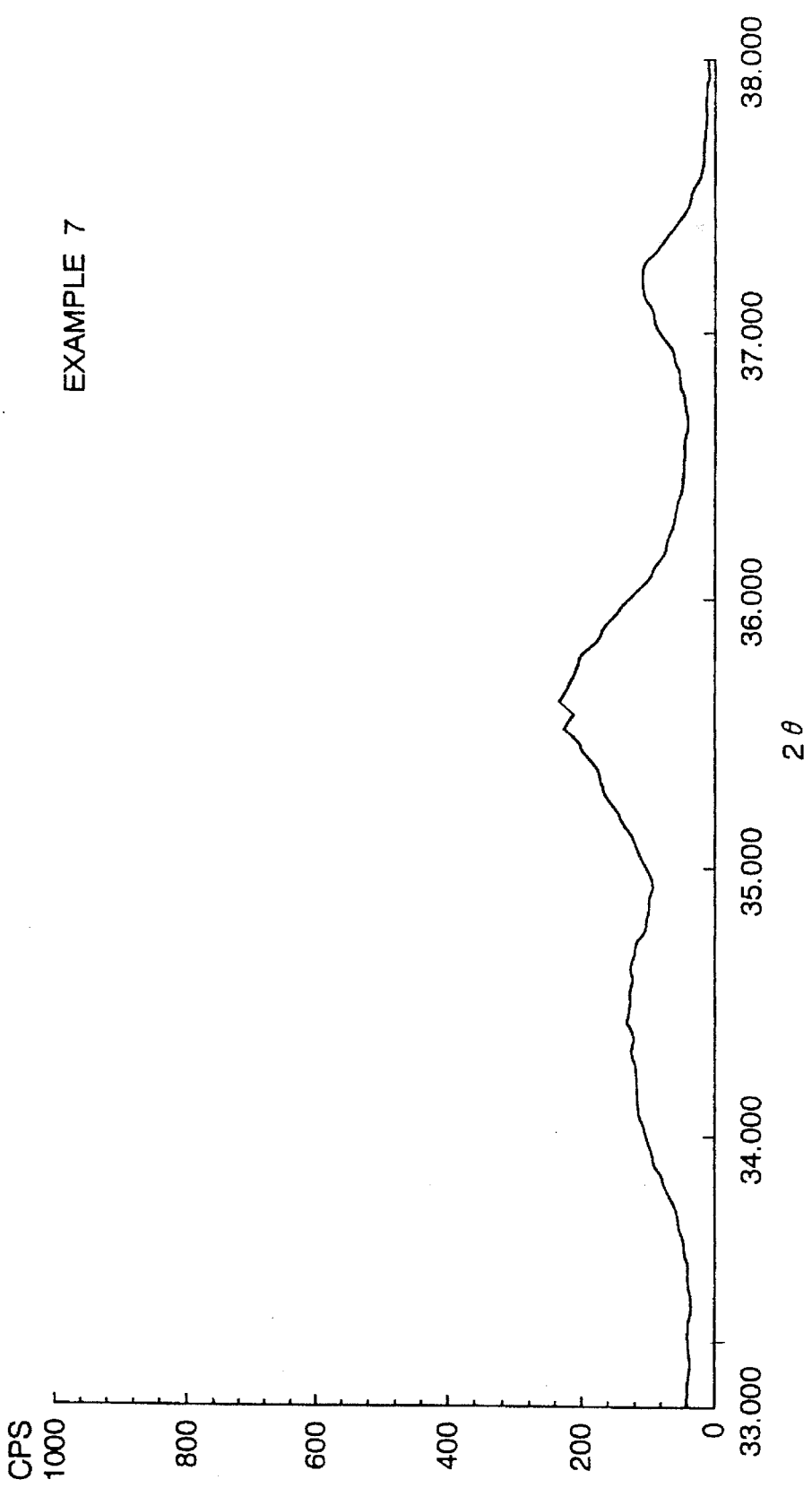
FIG. 8 shows the X-ray diffraction pattern for Example 7.

7) FIG. 8, for Example 7, shows that the X-ray diffraction peak of the plane (107) of diffraction of the powder of Example 7 appeared at 2θ=34.35. Furthermore, the X-ray diffraction peak of the plane (311) of the S phase appeared at 2θ=35.56, whereas the peak of the same plane of the powder of Example 7 appeared at 2θ=35.51. In addition, there was a larger difference in the pattern shape. Therefore, the powder of Example 7 is completely different in the crystal form from the S phase as well as the M phase.

Figure 9:
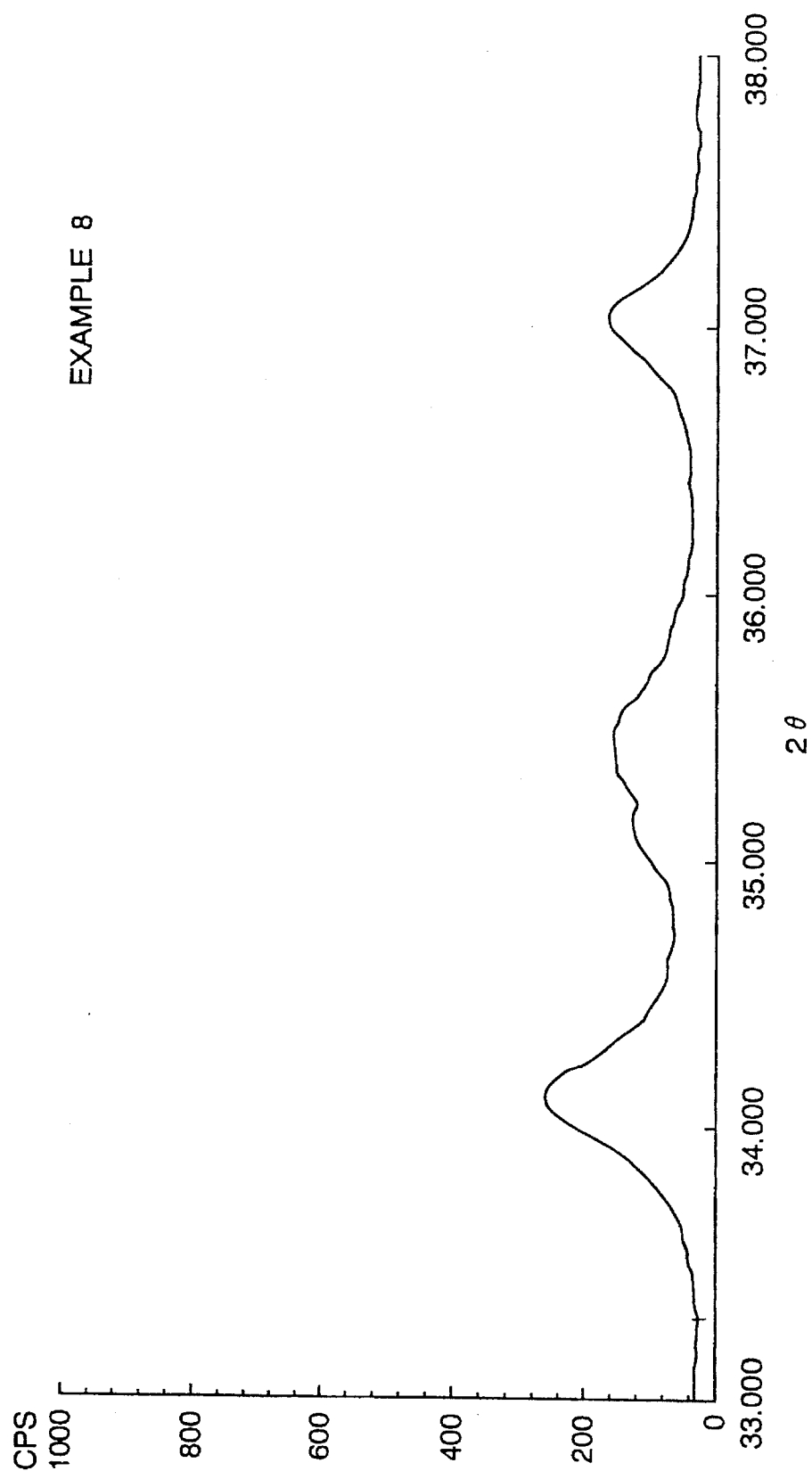
FIG. 9 shows the X-ray diffraction pattern for Example 8.

8) FIG. 9, for Example 8, shows that the X-ray diffraction peak of the plane (107) of diffraction of the powder of Example 8 appeared at 2θ=34.11. Furthermore, there was a larger difference in the pattern shape. Therefore, the powder of Example 8 is completely different in the crystal form from the S phase as well as the M phase.

Figure 10:
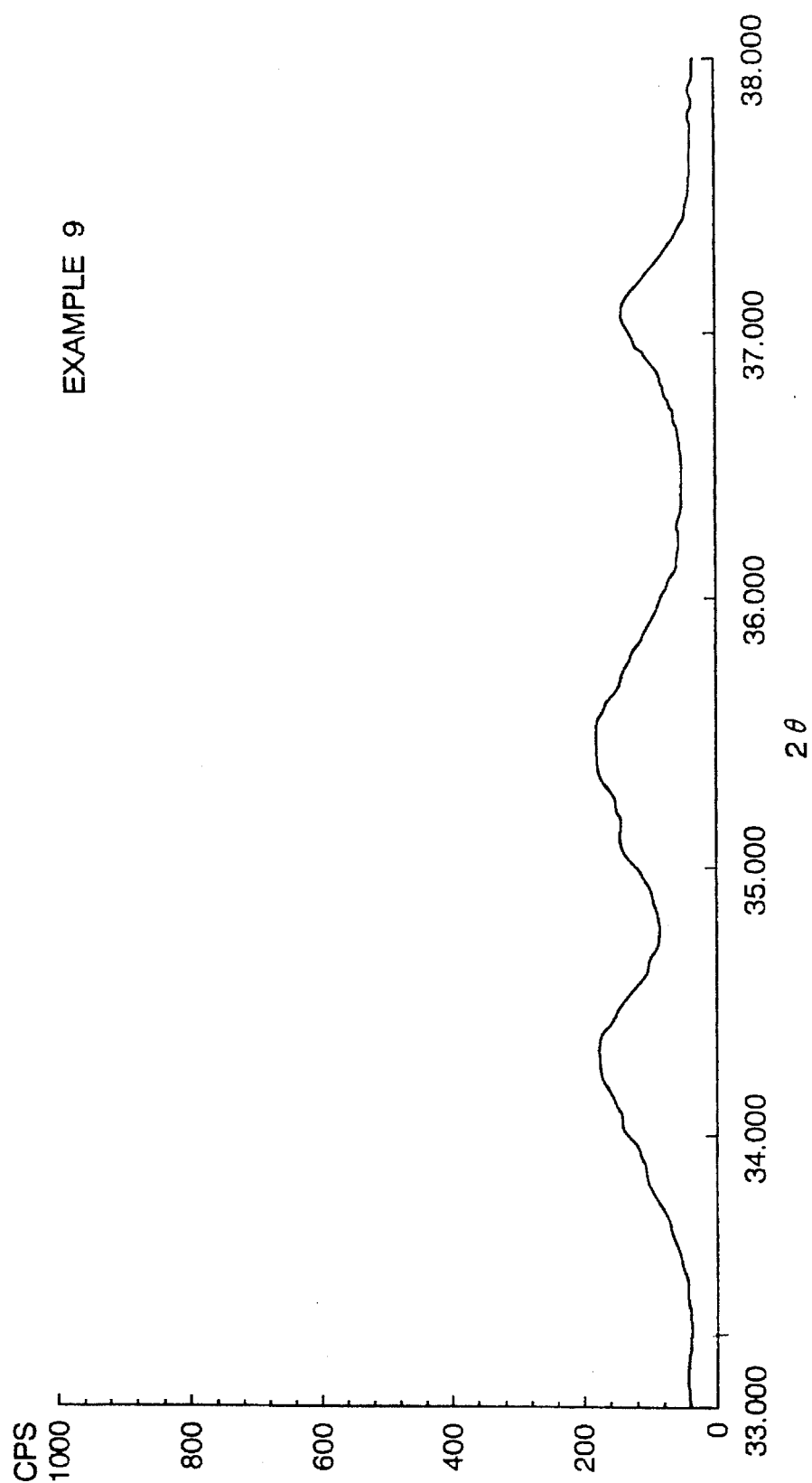
FIG. 10 shows the X-ray diffraction pattern for Example 9.

9) FIG. 10, for Example 9, was made from the same compositions used in Example 6, except that the heat treating temperature was 90° C. (150° C. in Example 6). FIG. 7, for Example 6, shows that the X-ray diffraction peak of the plane (107) of diffraction of the powder of Example 9 appeared at 2θ=34.24. Furthermore, there was a larger difference in the pattern shape.

Therefore, the powder of Example 9 is completely different in the crystal form from the S phase as well as the M phase.

Figure 11:
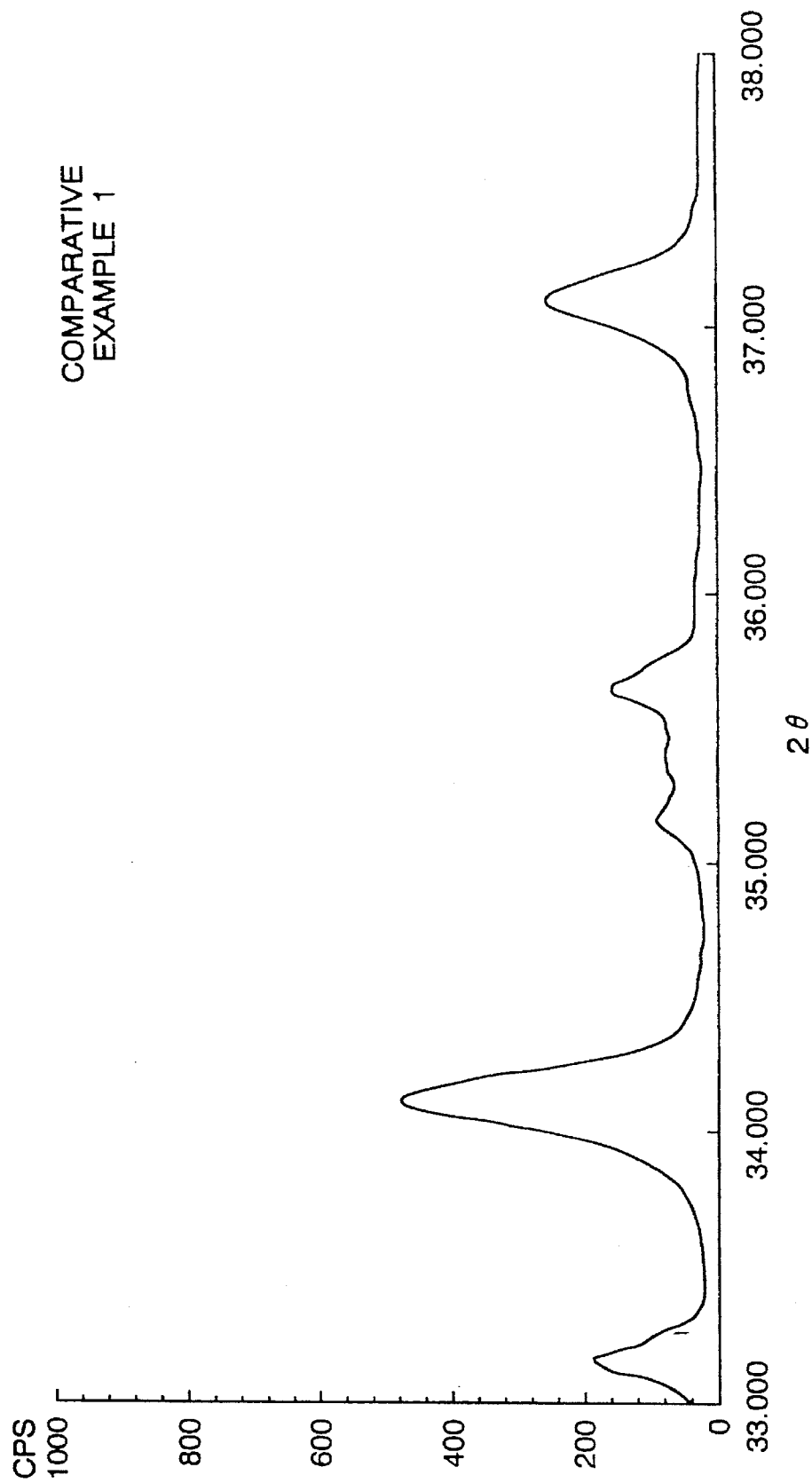
FIG. 11 shows the X-ray diffraction pattern for Comparative Example 1.

10) FIG. 11, for Comparative Example 1, shows that there were hematite (H) phase having an X-ray diffraction pattern peak at a plane (110) of diffraction: 2θ=35.62 and the same peak of the magnetoplumbite (M) phase at 2θ=34.07. Thus, it is seen that the crystal phase of Comparative Example 1 is a mere mixture of the H phase and M phase.

Figure 12:
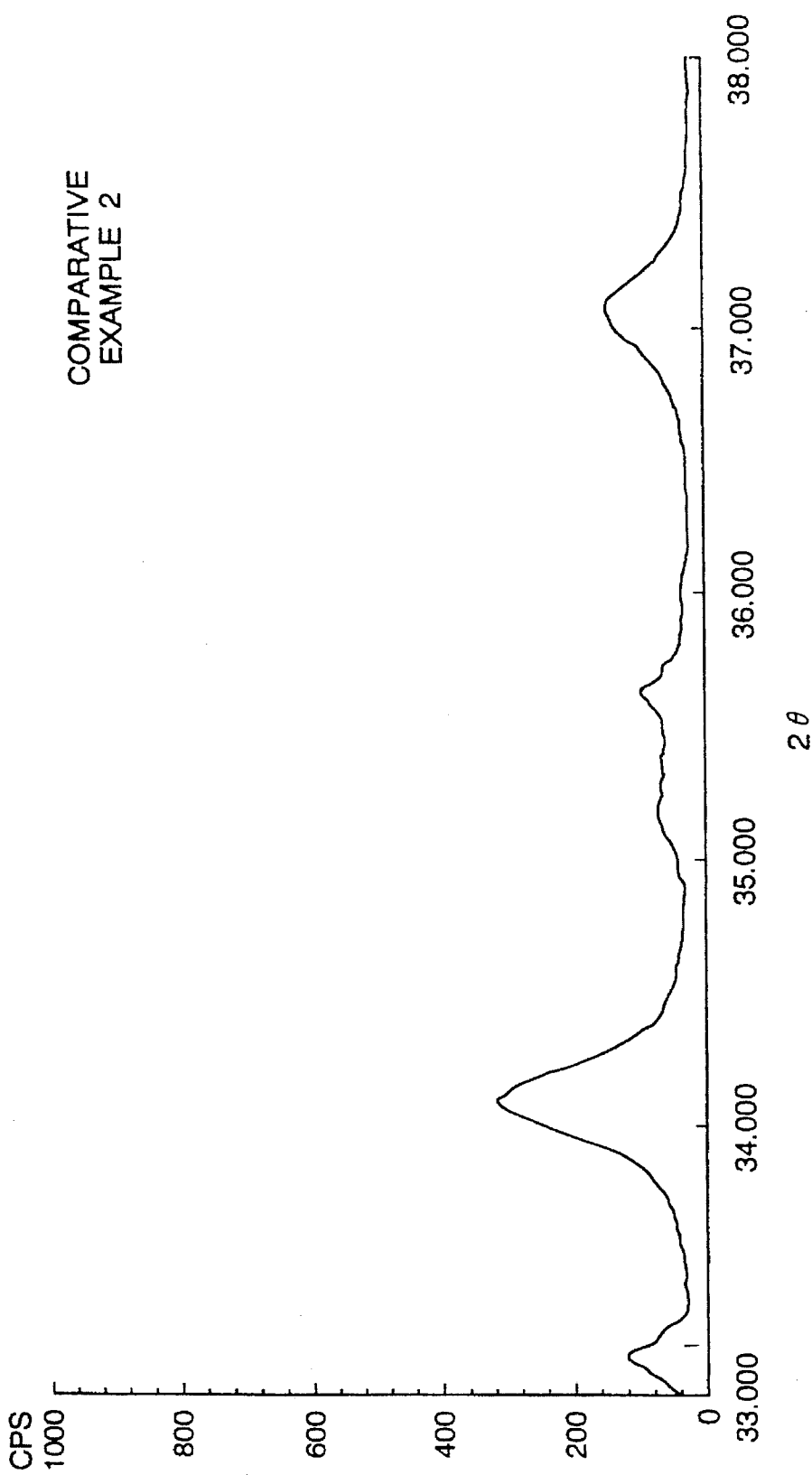
FIG. 12 shows the X-ray diffraction pattern for Comparative Example 2.

11) FIG. 12, for Comparative Example 2, shows that there was a minor amount of the H phase and a major amount of the M phase.

Figure 13:
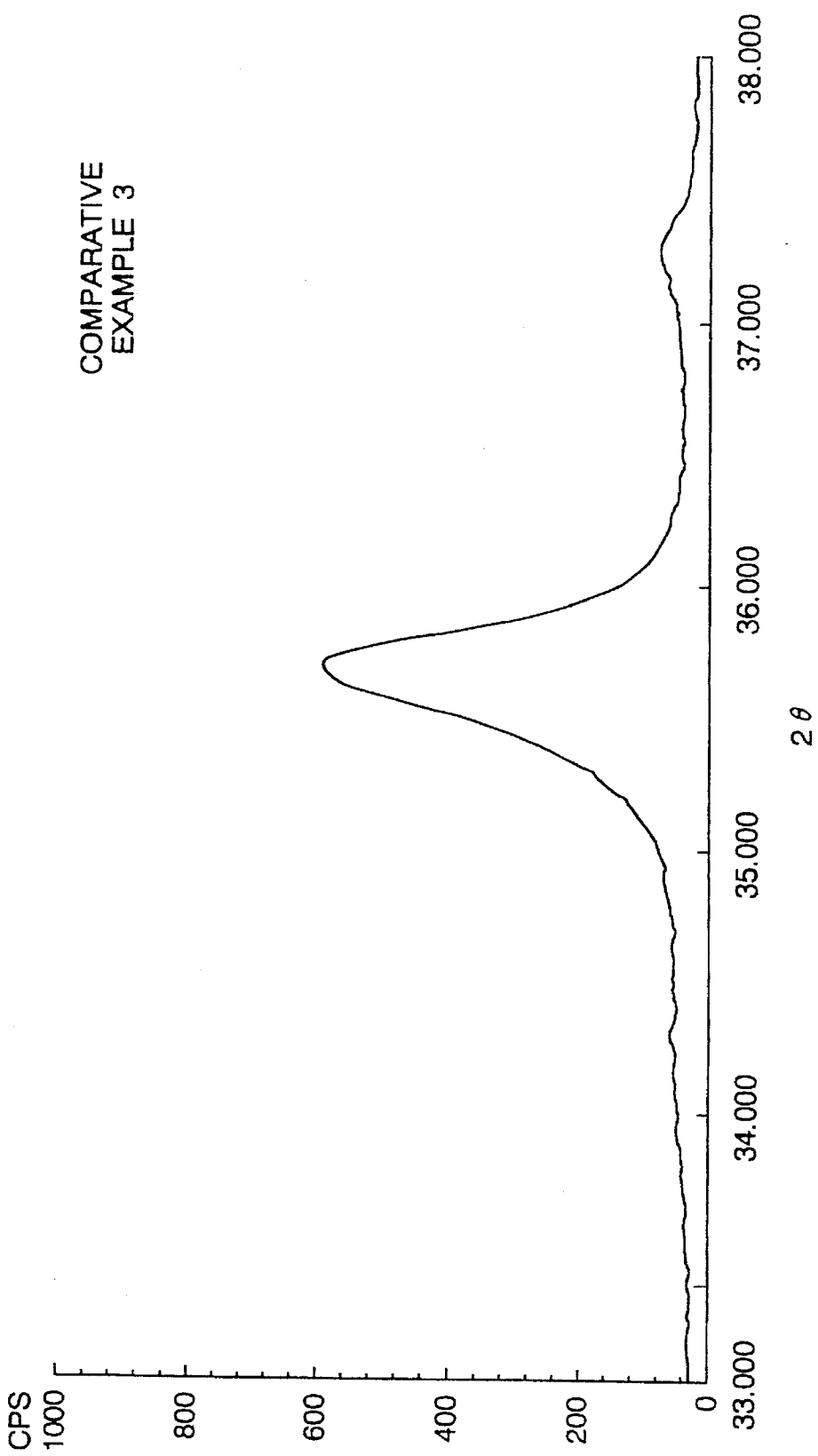
FIG. 13 shows the X-ray diffraction pattern for Comparative Example 3.

12) FIG. 13, for Comparative Example 3, shows that the intensity of the peak of diffraction of the M phase is very weak, but the diffraction pattern is similar to the S phase.

Figure 14:
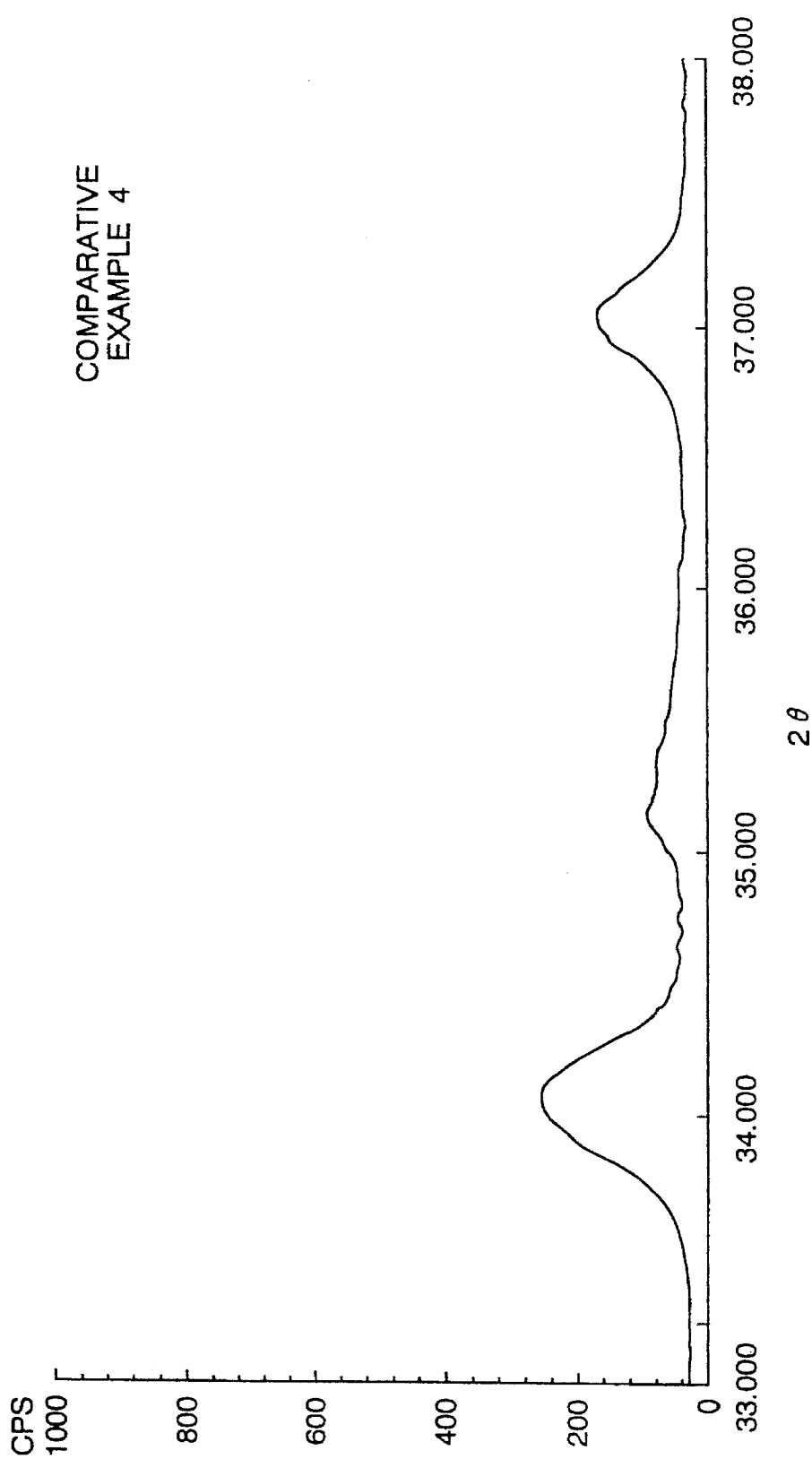
FIG. 14 shows the X-ray diffraction pattern for Comparative Example 4.
Figure 15:
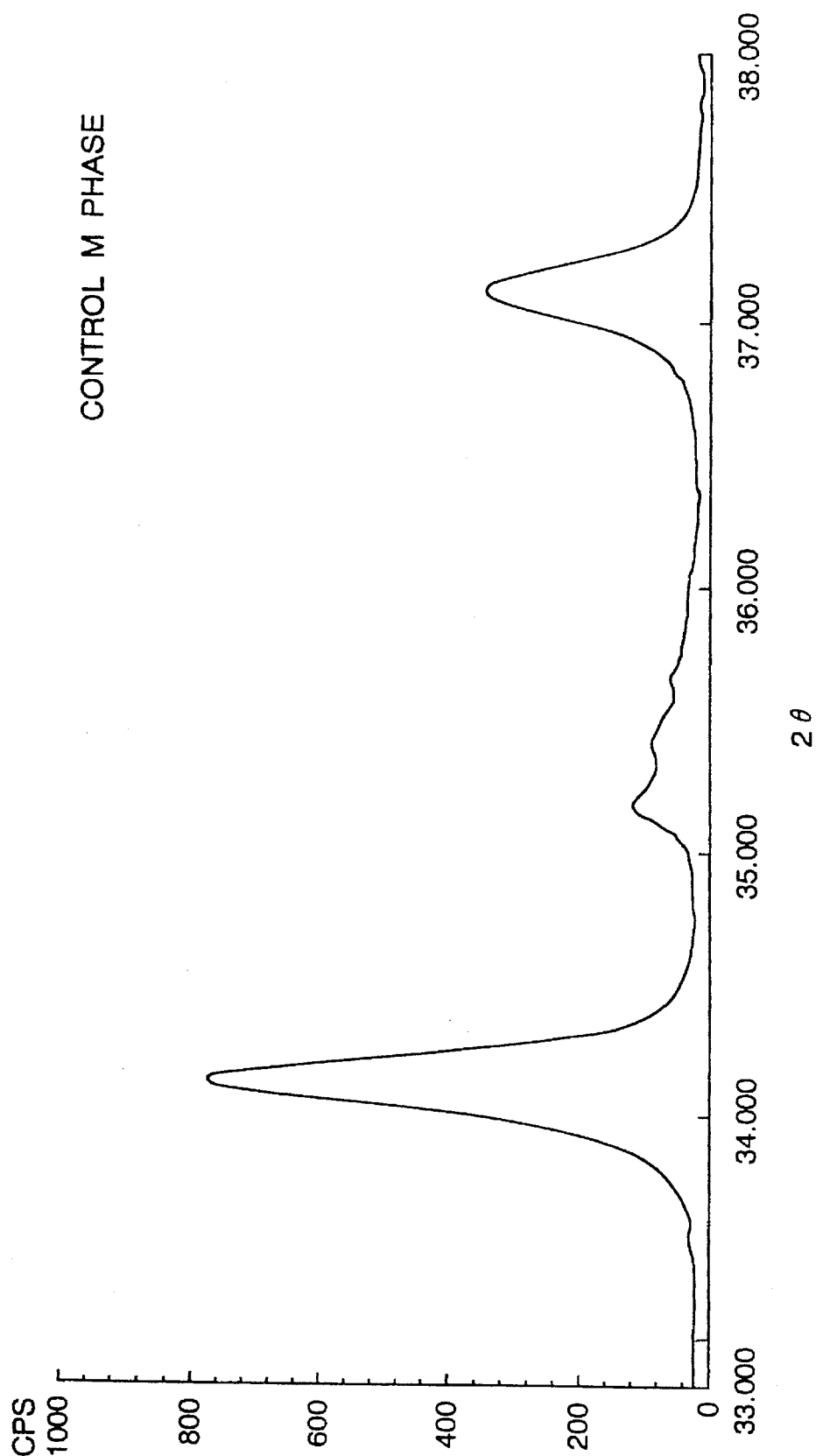
FIG. 15 shows the X-ray diffraction pattern of the Control, Magnetoplumbite (M) phase.
Figure 16:
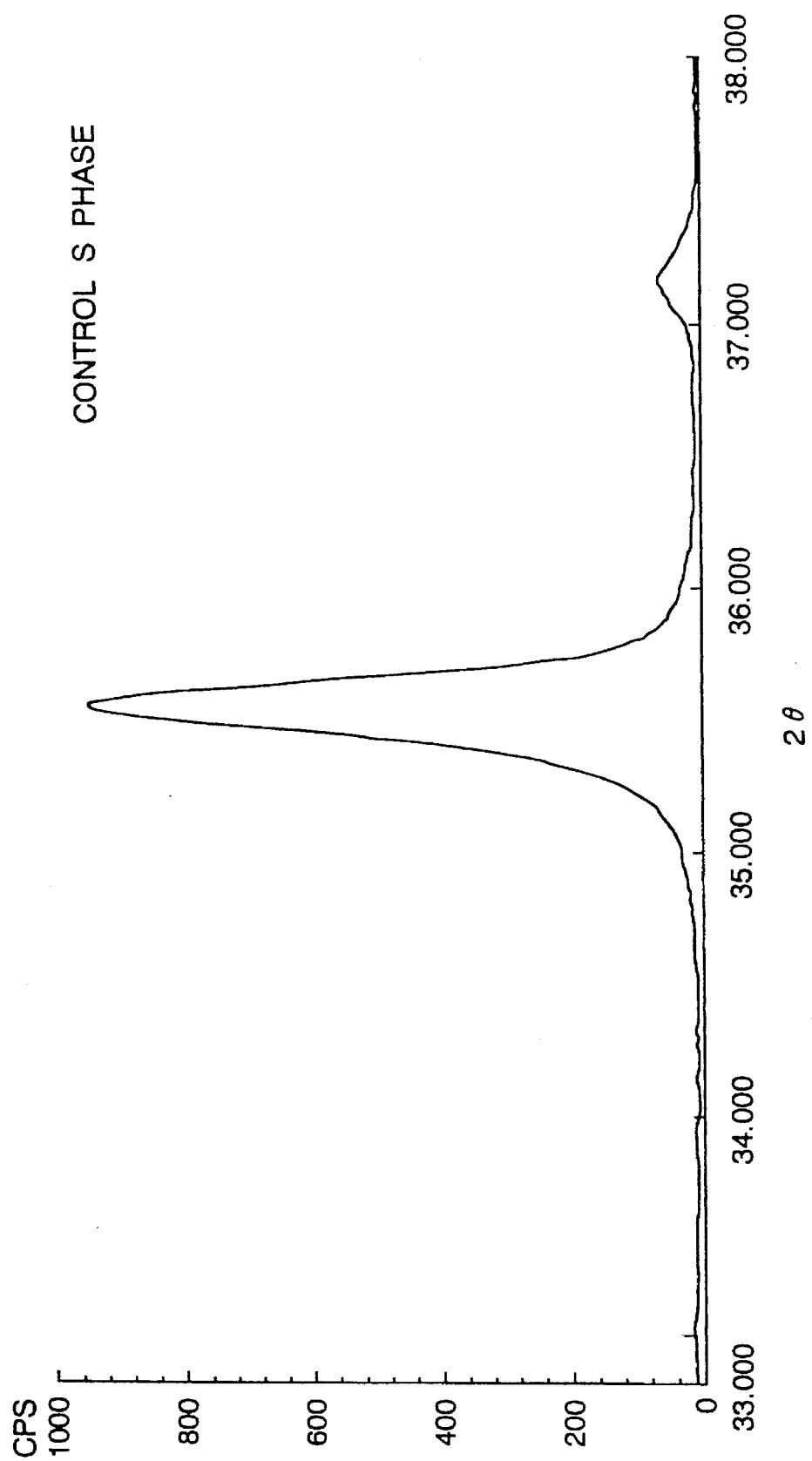
FIG. 16 shows the X-ray diffraction pattern for Control, Spinel (S) phase.

13) FIG. 14, for Comparative Example 4, shows that the X-ray diffraction pattern of Comparative Example 4 is highly similar to that of the M phase.

INDUSTRIAL APPLICABILITY

According to this invention, ferromagnetic fine powder comprising platelet like ferrite crystal particles with a very fine particle size having a high saturation magnetization value which is suitable for use particularly in perpendicular-magnetic-recording mediums and moreover also in longitudinal-recording mediums, can be obtained effectively by employing a relatively simple constitution, and therefore this invention is very useful for enhancement of recording density and output in magnetic recording.

We claim:

1. A ferromagnetic fine powder for magnetic recording of platelet ferrite crystal particles comprising constituents of Fe, Ba, Ni and Zn, having a Ba/Fe molar ratio of 1/50 to 1/12, wherein a total amount of Ni and Zn is less than 0.5 mole and not less than 0.07 mole per mole of Fe, said ferrite comprising a crystal phase being magnetoplumbite phase, spinel phase or composite phase thereof and said particles thereof have a saturation magnetization of at least 60 emu/g.

2. A ferromagnetic fine powder for magnetic recording according to claim 1, wherein the Ba/Fe molar ratio is 1/45 to 1/12.

3. A ferromagnetic fine powder for magnetic recording according to claim 1, wherein the molar ratio of the total amount of Ni and Zn to Fe is 0.14 to 0.4.

4. A ferromagnetic fine powder for magnetic recording according to claim 1, wherein the Zn/Fe molar ratio is 0.03 or more.

5. A ferromagnetic fine powder for magnetic recording of platelet ferrite crystal particles comprising constituents of Fe, Ba, Ni and Zn, having a Ba/Fe molar ratio is 1/50 to 1/8, wherein a total amount of Ni and Zn is less than 0.5 mole and not less than 0.07 mole per mole of Fe, wherein a Zn/Fe molar ratio is 0.03 or more, said ferrite comprising a crystal phase which is a composite of magnetoplumbite phase and spinel phase and wherein said particles have a saturation magnetization of at least 60 emu/g.

6. A ferromagnetic fine powder for magnetic recording according to claim 5, wherein the Ba/Fe molar ratio is 1/45 to 1/10, wherein the molar ratio of the total amount of Ni and Zn to Fe is 0.14 to 0.4, and wherein the Zn/Fe molar ratio is 0.03 or more.

7. A ferromagnetic ferrite fine powder for magnetic recording of platelet ferrite crystal particles comprising constituents of Fe, Ba, Ni and Zn, having a Ba/Fe molar ratio 1/44 to 1/12, wherein a total amount of Ni and Zn is 0.125 to 0.380 mole per mole of Fe, wherein a Zn/Fe molar ratio is 0.063 or more to 0.19 and a Ni/Fe molar ratio is 0.062 or more to 0.19, said ferrite comprising a crystal phase which is a composite of a magnetoplumbite phase and spinel phase and wherein said particles have a saturation magnetization of at least 60 emu/g.

8. A ferromagnetic ferrite fine powder for magnetic recording of platelet ferrite crystal particles comprising constituents of Fe, Ba, Ni and Zn and at least one element selected from Ti and Co, having a Ba/Fe molar ratio of 1/45 to 1/10, wherein the total amount of Ni and Zn is 0.07 to 0.5 mole per mole of Fe, and the Zn/Fe molar ratio is 0.03 or more;

said ferrite comprising a crystal phase which is a composite of a magnetoplumbite phase and spinel phase and wherein said particles have a saturation magnetization of at least 60 emu/g.

9. A ferromagnetic fine powder for magnetic recording of platelet ferrite crystal particles consisting essentially of constituents of Fe, Ba, Ni and Zn, having a Ba/Fe molar ratio of 1/50 to 1/8, wherein a total amount of Ni and Zn is less than 0.5 mole and not less than 0.07 mol per mole of Fe, said ferrite comprising a crystal phase being magnetoplumbite phase, spinel phase of composite phase thereof and said particles thereof have a saturation magnetization of at least 60 emu/g.

* * * * *